Patented June 6, 1933

1,912,448

UNITED STATES PATENT OFFICE

HENRY H. HARKINS, OF RIVER EDGE, NEW JERSEY, ASSIGNOR TO THE NAUGATUCK CHEMICAL COMPANY, OF NAUGATUCK, CONNECTICUT, A CORPORATION OF CONNECTICUT

VULCANIZATION OF RUBBER

No Drawing. Application filed June 19, 1931. Serial No. 545,495.

This invention relates to the vulcanization of rubber and similar vulcanizable materials and to the resulting products, and more particularly to the provision of an improved process for the vulcanization of the same in the presence of an accelerator and compounds or compositions with which to effect the purpose of the invention.

A new class of activators has now been found for organic accelerators, and more particularly for those of the ultra or semi-ultra type as represented by thiazyl sulphides, among which are the mercapto-aryl-thiazoles, benzothiazyl monosulphides, benzothiazyl disulphides and polynitro aryl benzothiazyl sulphides such as 2-4 dinitrophenyl benzothiazyl sulphides. The activators when used in conjunction with the desired accelerator in the vulcanizing operation permit of a reduction in the usual amount of the accelerator without losing the benefits of vulcanization that are attainable where the accelerator is used without the activator. Further advantages of the invention will be apparent from the hereinafter set forth description.

The activators broadly are salts of ammonia and strong acids, and more particularly such salts having the property of retarding the vulcanization of a mixture of rubber and sulphur. The vulcanization-retarding salts of ammonia have now been found to comprise the salts of ammonia and acids, which acids have a primary dissociation constant equal to or greater than that of oxalic acid.

For the purpose of illustrating the invention, the following examples in which the parts are by weight are given without limiting it thereto:

*Example 1.*—The following table shows the activating influence of ammonium chloride with reduced amounts of an organic accelerator (mercaptobenzothiazole).

Table I.—*Effect of activating mercaptobenzothiazole with ammonium chloride*

|  | A | B | C | D | E |
|---|---|---|---|---|---|
| Smoked sheet | 100 | 100 | 100 | 100 | 100 |
| Carbon black | 50 | 50 | 50 | 50 | 50 |
| Zinc oxide | 13 | 13 | 13 | 13 | 13 |
| Pine tar | 5 | 5 | 5 | 5 | 5 |
| Stearic acid | 1.25 | 1.25 | 1.25 | 1.25 | 1.25 |
| Sulphur | 3.5 | 3.5 | 3.5 | 3.5 | 3.5 |
| Mercaptobenzothiazole | 1.25 | 1.0 | .75 | .5 | .25 |
| CURE AT 30# STEAM PRESSURE | | | | | |
| *Green tensile* | | | | | |
| 15′ | 2922 | 2962 | 1638 | Too poor to test | Too poor to test |
| 30′ | 3722 | 3817 | 3355 | 2745 | Too poor to test |
| 45′ | 4066 | 3987 | 3752 | 3245 | 2090 |
| 60′ | 4036 | 4173 | 3987 | 3202 | 2683 |
| 75′ | 3920 | 3882 | 3853 | 3362 | 2623 |
| 90′ | 3910 | 4040 | 3930 | 3462 | 3210 |
| Same formula+ Ammonium chloride | | .3 | .5 | .75 | 1.0 |
| 15′ | | 3032 | 3361 | 2998 | Too poor to test |
| 30′ | | 3973 | 3906 | 3845 | 2205 |
| 45′ | | 4237 | 4284 | 4110 | 2846 |
| 60′ | | 4393 | 4315 | 4038 | 3293 |
| 75′ | | 3978 | 3897 | 3705 | 3432 |
| 90′ | | 3824 | 3793 | 3610 | 3550 |

*Example 2.*—The following table shows the activating influence of ammonium chloride in a stock such as represented under column B, Table I, having the steartic acid replaced by ammonium chloride.

Table II.—*Effect of varying ammonium chloride using one part of mercaptobenzothiazole and leaving out stearic acid*

| Stearic acid | 1.25 | | | | |
|---|---|---|---|---|---|
| Mercaptobenzothiazole | 1.00 | 1.00 | 1.00 | 1.00 | 1.00 |
| Ammonium chloride | | | .5 | 1.00 | 1.25 |
| CURE AT 30# STEAM | | | | | |
| *Green tensile* | | | | | |
| 15′ | 1469 | 896 | 1626 | 2040 | 3133 |
| 30′ | 3216 | 2040 | 3633 | 3868 | 3997 |
| 45′ | 3687 | 3250 | 3379 | 3775 | 3563 |
| 60′ | 3598 | 3249 | 3459 | 3619 | 3909 |
| 75′ | 3603 | 2905 | 3214 | 3640 | 3610 |
| 90′ | 3598 | 3106 | 3325 | 3682 | 3572 |

*Example 3.*—The invention is further illustrated by the following tables which show the use of low and high amounts of zinc oxide, and that stearic acid may be replaced with ammonium chloride:

*Table III.—Activation with ammonium chloride in a pure gum stock*

| | | | |
|---|---|---|---|
| Smoked sheet | 100 | 100 | 100 |
| Zinc oxide | 5 | 5 | 5 |
| Sulphur | 3.5 | 3.5 | 3.5 |
| Stearic acid | | 1.0 | |
| Ammonium chloride | | | .5 |
| Mercaptobenzothiazole | .8 | .8 | .8 |
| CURE AT 30# STEAM | | | |
| *Green tensile* | | | |
| 15' | 2144 | 2044 | 2053 |
| 30' | 2709 | 2879 | 2873 |
| 45' | 2798 | 3124 | 3135 |
| 60' | 2996 | 3311 | 3112 |
| 75' | 2868 | 3303 | 3026 |
| 90' | 3039 | 3263 | 3249 |

*Table IV*

| | | | | | |
|---|---|---|---|---|---|
| Smoked sheet | 100 | 100 | 100 | 100 | 100 |
| Zinc oxide | 13 | 13 | 13 | 13 | 13 |
| Sulphur | 3.5 | 3.5 | 3.5 | 3.5 | 3.5 |
| Mercaptobenzothiazole | 1.25 | 1.0 | .75 | .50 | .25 |
| Stearic acid | 1.25 | 1.25 | 1.25 | 1.25 | 1.25 |
| Ammonium chloride | | .75 | .75 | .75 | .75 |
| CURE AT 30# STEAM PRESSURE | | | | | |
| *Green tensile* | | | | | |
| 15' | 3135 | 3499 | 3159 | 2830 | 2078 |
| 30' | 3466 | 4083 | 3909 | 3092 | 2855 |
| 45' | 3085 | 4093 | 3848 | 3644 | 3302 |
| 60' | 3623 | 3890 | 3930 | 3590 | 3442 |
| 75' | 3314 | 3869 | 3909 | 3673 | 3493 |
| 90' | 2878 | 3875 | 3695 | 3703 | 3613 |
| Same formula without ammonium chloride | | | | | |
| *Green tensile* | | | | | |
| 15' | | 2420 | 2557 | 1773 | 1200 |
| 30' | | 3223 | 3333 | 2667 | 2057 |
| 45' | | 3667 | 3490 | 3178 | 2632 |
| 60' | | 3497 | 3162 | 3193 | 2647 |
| 75' | | 3352 | 3700 | 3382 | 2612 |
| 90' | | 3440 | 3537 | 3365 | 2973 |

*Example 4.*—The following table shows the relative abrasion resisting values obtainable with a stock of the type shown in Table I, using stearic acid, accelerator and ammonium chloride as shown:

*Table V*

| | | | | | | |
|---|---|---|---|---|---|---|
| Stearic acid | 1.25 | 1.25 | 2.25 | | 1.25 | 1.25 |
| Mercaptobenzothiazole | 1.25 | 1.25 | 1.25 | 1.25 | 1.25 | 1.25 |
| Ammonium chloride | | | .5 | .5 | 1.25 | .10 | .30 |
| Rating | 100% | 105% | 108% | 107% | 103% | 108% |

*Example 5.*—Table VI shows how resistance to abrasion of a low zinc stock may be improved by the use of ammonium chloride, and also how the accelerator may be reduced to .5 part when it is properly activated, with no loss in resistance to abrasion.

*Table VI*

| | | | | |
|---|---|---|---|---|
| Smoked sheet | 100 | 100 | 100 | 100 |
| Carbon black | 50 | 50 | 50 | 50 |
| Pine tar | 5 | 5 | 5 | 5 |
| Palm oil | 1 | 1 | 1 | 1 |
| Zinc oxide | 2 | 2 | 2 | 2 |
| Zinc soaps of fatty acids | 2 | 2 | 2 | 2 |
| Mercaptobenzothiazole | 1.25 | 1.25 | .75 | .50 |
| Antioxidant | 1 | 1 | 1 | 1 |
| Sulphur | 3.5 | 3.5 | 3.5 | 3.5 |
| Ammonium chloride | | .5 | .5 | .5 |
| Resistance to abrasion | 100% | 110% | 105% | 102% |

*Example 6.*—The following Table VII shows the activating effect of ammonium chloride when sprayed with ammonia-preserved latex, on mercaptobenzothiazole:

*Table VII.—The activating influence of 1 part of ammonium chloride when present in ammonia-latex sprayed rubber (whale)*

| | | | | |
|---|---|---|---|---|
| Whale without ammonium chloride | 100 | | 100 | |
| Whale with 1 part of chloride | | 100 | | 100 |
| Zinc oxide | 5 | 5 | 5 | 5 |
| Sulphur | 3.5 | 3.5 | 3.5 | 3.5 |
| Mercaptobenzothiazole | .5 | .5 | 1 | 1 |
| CURE AT 30# STEAM | | | | |
| *Green tensile* | | | | |
| 5' | 1806 | 1955 | 2168 | 2544 |
| 10' | 2269 | 2656 | 3081 | 3565 |
| 15' | 2562 | 3101 | 3651 | 3744 |
| 20' | 3053 | 3499 | 3471 | 3871 |

This data show that ammonium chloride, when sprayed with ammonia latex, exerts some activating effect on mercaptobenzothiazole.

Other rubbers may be used instead of smoked sheets, for example pale crepe and creamed rubbers, with similar improvement in abrasion resistance. Creamed rubbers are rubbers obtained by creaming latex and recovering the rubber from the cream by coagulation, spray drying, or otherwise.

The invention presents manifold advantages. Tensiles have been obtained by using 0.5 part of mercaptobenzothiazole and .75 part of ammonium chloride per 100 parts of rubber (smoked sheet), which are as high as where 1 part of mercaptobenzothiazole is used alone. This allows a reduction of about one-half in the accelerator cost. Also rubber stocks containing as low as 2 parts of zinc oxide have been found to cure well when containing such as ammonium chloride and an accelerator such as mercaptobenzothiazole, with improvement in abrasion resistance of from 8 to 10%. The invention further allows the omission in tire tread compounds of such as stearic acid with substantially no lowering of tensiles or green abrasive values. The non-use of such as stearic acid removes a source of blooming in the vulcanized stocks.

The invention has been found to be particularly useful in the vulcanization of rubbers which contain a sub-normal percentage of latex serum solids when compared with normal latex, for example such as smoked sheet, pale crepe and creamed rubbers.

Instead of ammonium chloride, other salts of ammonia may be used such as ammonium bromide, ammonium iodide, ammonium nitrate, ammonium acid sulphate, primary ammonium phosphate, ammonium phosphite, ammonium sulphite, ammonium dichloracetate, ammonium trichloracetate, ammonium oxalate, within the broad scope of the invention. The results obtained with the ammonium halide are particularly effective, and more notably that with ammonium chloride.

The invention may be employed in connection with latex (natural or artificially prepared) as well as solid rubbers for the production of finished rubber goods. Materials of this invention may be mixed in any desired manner at any stage prior to the actual vulcanizing operation. It is also clear that various softeners, anti-agers and other compounding ingredients may be used in conjunction with the accelerator and activator.

The invention disclosed may be used in the preparation of inner tubes, tires, thread, hose, dipped goods, chemical goods, latex or articles made from latex, etc.

With the detailed description given above, it will be obvious that modifications will suggest themselves without departing from the principle of the invention, and it is not desired to limit the invention otherwise than as set forth in the appended claims.

Having thus described my invention, what I claim and desire to protect by Letters Patent is:

1. A process of producing vulcanized rubber which comprises vulcanizing rubber containing sulphur, zinc ozide and mercaptobenzothiazole in the presence of ammonium halide.

2. A process of producing vulcanized rubber which comprises vulcanizing rubber containing sulphur, zinc oxide and mercaptobenzothiazole in the presence of ammonium chloride.

3. A vulcanized rubber product resulting from the process set forth in claim 1.

4. A vulcanized rubber product resulting from the process set forth in claim 2.

5. A vulcanization accelerator mixture comprising a thiazyl sulphide vulcanization accelerator and the ammonium salt of an acid having a dissociation constant not less than that of oxalic acid.

6. A vulcanization accelerator mixture comprising a thiazyl sulphide vulcanization accelerator and the ammonium salt of a mineral acid having a dissociation constant not less than that of oxalic acid.

7. A vulcanization accelerator mixture comprising a benzothiazyl sulphide accelerator and the ammonium salt of a mineral acid having a dissociation constant not less than that of oxalic acid.

8. A vulcanization accelerator mixture comprising a mercaptobenzothiazole vulcanization accelerator and an ammonium halide.

9. A vulcanization accelerator mixture comprising mercaptobenzothiazole and ammonium halide.

10. A vulcanization accelerator mixture comprising mercaptobenzothiazole and ammonium chloride.

11. A process of producing vulcanized rubber which comprises adding to rubber prior to vulcanization a vulcanizing agent, an organic accelerator, and the ammonium salt of an acid normally capable of retarding the vulcanization of a mixture of rubber and sulphur, and vulcanizing the rubber.

12. A process of producing vulcanized rubber which comprises adding to rubber prior to vulcanization a vulcanizing agent, an organic accelerator, and the ammonium salt of an acid having a dissociation constant not less than that of oxalic acid, and vulcanizing the rubber.

13. A process of producing vulcanized rubber which comprises adding to rubber prior to vulcanization a vulcanizing agent, an ultra or semi-ultra organic accelerator, and the ammonium salt of an acid having a dissociation constant not less than that of oxalic acid, and vulcanizing the rubber.

14. A process of producing vulcanized rubber which comprises adding to rubber prior to vulcanization a vulcanizing agent, an ultra or semi-ultra organic accelerator, and the ammonium salt of a mineral acid having a dissociation constant not less than that of oxalic acid, and vulcanizing the rubber.

15. A process of producing vulcanized rubber which comprises adding to rubber prior to vulcanization a vulcanizing agent, a thiazyl sulphide vulcanization accelerator, and the ammonium salt of a mineral acid having a dissociation constant not less than that of oxalic acid, and vulcanizing the rubber.

16. A process of producing vulcanized rubber which comprises adding to rubber prior to vulcanization a vulcanizing agent, a mercaptobenzothiazole vulcanization accelerator, and the ammonium salt of a mineral acid having a dissociation constant not less than that of oxalic acid, and vulcanizing the rubber.

Signed at Passaic, county of Passaic, State of New Jersey, this 16th day of June, 1931.

HENRY H. HARKINS.